United States Patent
Bolen et al.

(10) Patent No.: US 7,502,919 B2
(45) Date of Patent: Mar. 10, 2009

(54) METHOD FOR SELECTING LOCAL OR REMOTE KEYBOARD CONTROL IN LEGACY USB MODE WITHIN PREDETERMINED TIME

(75) Inventors: Austin P. Bolen, Austin, TX (US); Mukund P. Khatri, Austin, TX (US); Allen C. Wynn, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 137 days.

(21) Appl. No.: 11/548,436

(22) Filed: Oct. 11, 2006

(65) Prior Publication Data

US 2007/0168585 A1  Jul. 19, 2007

Related U.S. Application Data

(63) Continuation of application No. 10/425,172, filed on Apr. 29, 2003, now Pat. No. 7,136,993.

(51) Int. Cl.
*G06F 15/177* (2006.01)

(52) U.S. Cl. .......................................... 713/1; 709/208

(58) Field of Classification Search .................. 713/1; 710/63; 709/208
See application file for complete search history.

(56) References Cited

U.S. PATENT DOCUMENTS

| | | | | |
|---|---|---|---|---|
| 5,717,428 A | * | 2/1998 | Barrus et al. | 345/168 |
| 5,828,900 A | * | 10/1998 | DeLeeuw et al. | 710/16 |
| 5,898,861 A | * | 4/1999 | Emerson et al. | 703/23 |
| 5,923,866 A | * | 7/1999 | Chen | 703/21 |
| 6,106,564 A | * | 8/2000 | Chen | 703/21 |
| 6,266,715 B1 | | 7/2001 | Loyer et al. | 710/22 |
| 6,370,635 B2 | | 4/2002 | Snyder | 712/32 |
| 6,389,560 B1 | | 5/2002 | Chew | 714/43 |
| 6,550,006 B1 | * | 4/2003 | Khanna | 713/2 |
| 6,557,068 B2 | | 4/2003 | Riley et al. | 710/306 |
| 6,687,744 B1 | * | 2/2004 | Cromer et al. | 709/208 |

* cited by examiner

*Primary Examiner*—Chun Cao
(74) *Attorney, Agent, or Firm*—Hamilton & Terrile, LLP; Robert W. Holland

(57) ABSTRACT

A remote access module associated with a BIOS of an information handling system having a UHCI-based USB controller allows selection of legacy USB control with a local keyboard or access by a remote keyboard through a remote access bus master adapter. Input from an inactive local or remote keyboard results in automated enabling of the inactive keyboard and disabling of the active keyboard. In one embodiment, remote access to a keyboard port during legacy USB control saves the data associated with the remote access to a memory location accessible to the BIOS and invokes the BIOS to obtain the data. In another embodiment, a legacy USB control option is offered by a display to a user associated with a local keyboard and legacy USB control disabled if the user fails to select local access in a predetermined time period.

7 Claims, 4 Drawing Sheets

METHOD FOR SELECTING LOCAL OR REMOTE KEYBOARD CONTROL IN LEGACY USB MODE WITHIN PREDETERMINED TIME

This application is a continuation of application Ser. No. 10/425,172, filed Apr. 29, 2003 now U.S. Pat. No. 7,136,993, entitled "Method and System for Remote Access to Keyboard Control in Legacy USB Mode" and naming Austin P. Bolen, Mukund P. Khatri, and Allen C. Wynn as inventors, which is hereby incorporated by reference in its entirety.

BACKGROUND OF THE INVENTION

1. Field of the Invention

The present invention relates in general to the field of remote access to an information handling system, and more particularly to a method and system for access to keyboard control in USB emulation mode.

2. Description of the Related Art

As the value and use of information continues to increase, individuals and businesses seek additional ways to process and store information. One option available to users is information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling system to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are used to provide a number of functions that have a minimal direct interaction with users. For instance, server information handling systems process network information with little if any keyboard or mouse inputs from keyboard or mouse devices directly connected to the server information handling system. Often, administrators or other users who interact with the server information handling system do so remotely through information handling systems that communicate with the server over the network. For instance, the server includes a bus master adapter card that accepts calls from remote devices to keyboard or mouse ports, such as ports $60h$ and $64h$, received through the network and forwards the port calls to the keyboard controller for handling as if the keyboard inputs were provided from a local input/output device. For instance, the Dell Remote Access Controller (DRAC) card and the Embedded Remote Access Option (ERA/O) emulate keystrokes by writing directly to ports $60h$ and $64h$ on the server. Typically, remote input/output devices communicate through software drivers running in conjunction with the operating system to provide flexible control by administrators of a server through information handling systems communication with the server through the network.

One difficulty with access to an information handling system through remote input output devices is that operating system drivers to support remote access are not available during power-up and boot of an information handling system so that the basic input output system (BIOS) generally must coordinate keystroke inputs with what is generally known as legacy USB mode. With USB controllers that comply with the Open Host Controller Interface (OHCI), enablement of the legacy USB mode allows detection of accesses to ports $60h$ and $64h$, stores data values for those accesses and generates a system management interrupt (SMI). The BIOS SMI handler gets data for port accesses from the OHCI USB controller to handle keystrokes. By comparison, with USB controllers that comply with the Universal Host Controller Interface (UHCI) standard, the controller does not keep data that was written to ports $60h$ and $64h$ so that data received from a remote device through a bus master adapter generally cannot be retrieved by the BIOS. Thus, an information handling system with a USB keyboard and a UHCI USB controller having legacy USB enabled generally cannot be remotely controlled through a remote access until the operating system is loaded and its USB driver takes control. With a UHCI compliant controller, a remote user cannot perform a number of boot functions, such as pressing F2 to enter setup, CTRL-M to enter PERC/4 configuration utility, F1 in response to a prompt displayed for a boot error or make boot selections from Windows boot manager screen.

SUMMARY OF THE INVENTION

Therefore a need has arisen for a method and system which selectively enables activation of local or remote input devices for an information handling system operating under legacy USB where the input device controller does not save remote access data for retrieval by system BIOS.

A further need exists for a method and system which allows concurrent access of local and remote input devices for an information handling system operating under legacy USB where the USB controller does not save remote access data for retrieval by system BIOS.

In accordance with the present invention, a method and system are provided which substantially reduce the disadvantages and problems associated with previous methods and systems for selective activation of local or remote input devices to an information handling system operating in legacy USB mode. Information from a remote input device accepted through a bus master adapter and not saved by a UHCI USB controller is made accessible to the BIOS to selectively enable the remote device to input information in cooperation with the BIOS in legacy USB mode.

More specifically, a remote access module associated with the BIOS detects local or remote keyboards and configures the information handling system to accept inputs from a selected keyboard. In one embodiment, the remote access module boots in legacy USB mode and presents a local control option for the user to select in a predetermined time period. If the user makes the selection, the information handling system boots in legacy USB mode, and if the user does not make the selection, legacy USB is disabled to allow remote control. In another embodiment, keyboard inputs from an inactive keyboard are used to select that keyboard. If the remote keyboard is inactive and make an input, a delay of a predetermined time is set to detect additional remote inputs before selection of the remote device and disablement of legacy USB. If the remote keyboard is active and legacy USB is inactive, and a key is pressed on the local USB keyboard, a delay of a predetermined time is set to detect additional local USB keyboard inputs before enabling legacy USB and inactivating the remote keyboard.

In another embodiment, concurrent use of local and remote input devices for an information handling system operating in legacy USB mode is supported by accepting information from a remote input device through a bus master adapter and making the information available to BIOS access, even where the information is not saved by the USB controller, such as with UHCI-based USB controllers. The remote access module sets a bit in the bus master adapter when the information handling system is in legacy USB mode so that the bus master adapter saves data received from remote keyboard or mouse port accesses in a memory or I/O location accessible to the BIOS. When a remote port access is received, the bus master adapter sets the memory location in a semaphore and invokes the BIOS to retrieve the data.

The present invention provides a number of important technical advantages. One example of an important technical advantage is that information handling systems having UHCI USB controllers and operating in legacy mode selectively activate local or remote input devices. Another example of an important technical advantage is that information handling systems having UHCI USB controllers and operating in legacy SUB mode provide concurrent access to local and remote input devices. Thus, for instance, a network administrator is able to interact with a server information handling system from a remote device to perform setup or other functions before the operating system has come on line at the server information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system operating in legacy USB mode with a UHCI USB controller selectively accepts remote keyboard inputs by making the remote keyboard data accessible to the information handling system BIOS. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk devices, one or more network ports for communicating with external devices as well as various input and output (I/O) devices, such as a keyboard, a mouse, and a video display. The information handling system may also include one or more buses operable to transmit communications between the various hardware components.

Figure 1:
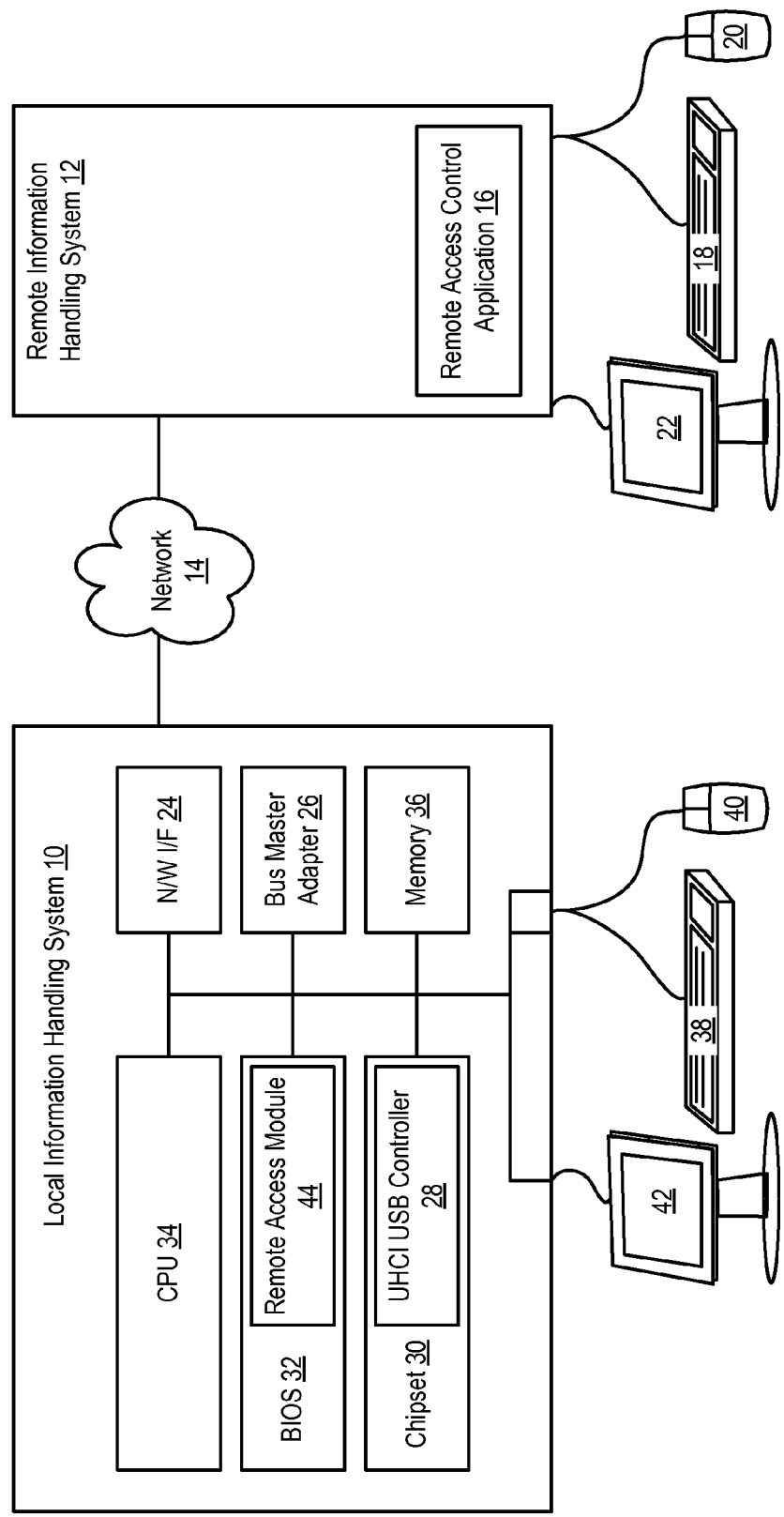
FIG. 1 depicts a block diagram of an information handling system with a UHCI USB controller configured for selective local or remote keyboard access.

Referring now to FIG. 1, a block diagram depicts a local information handling system 10 interfaced with a remote information handling system 12 through a network 14. Remote information handling system 12 accesses local information handling system 10 with a remote access control application 16 that allows remote input and output devices, such as a remote keyboard 18, remote mouse 20 and remote display 22, to interface through network with applications and components of local information handling system 10. Data to and from the remote input and output devices is communicated through network 14 and a network interface 24 with a bus master adapter 26. For instance, bus master adapter 26 allows remote keyboard 18 to control local information handling system 10 by communicating keystroke inputs through a UHCI USB controller 28 of a chipset 30. Thus, bus master adapter 26 allows remote input and output devices to interact with components, such as BIOS 32, CPU 34 and memory 36, in much the same manner as local input and output devices, such as local keyboard 38, local mouse 40 and local display 42.

UHCI USB controller 28 operates in a legacy USB mode in which inputs to local keyboard 38 are processed in cooperation with BIOS 32, such as during system boot before the operating system brings drivers up to process the keyboard inputs. For instance, UHCI USB controller 28 with legacy USB enabled accepts inputs from local keyboard 38 before operating system USB drivers are available, such as an F2 input to enter system setup, CTRL-M to enter the PERC/4 configuration utility, F1 if requested by a prompt displayed due to an error or boot selections from the Windows boot manager screen. However, UHCI USB controller 28 with legacy USB enabled is unable to directly accept inputs from remote keyboard 18 or mouse 20 since data associated with a port 60h or 64h IO issued by bus master adapter 26 is not retrievable by BIOS 32 and the UHCI specification does not call for USB controller 28 to keep the data written to port 60h or 64h. In order to accept remote inputs in legacy USB mode, a remote access module associated with BIOS 32 coordinates operations of bus master adapter 26 and UHCI USB controller 28 to make data written to port 60h or 64h by bus master adapter available to BIOS 32.

Figure 2:
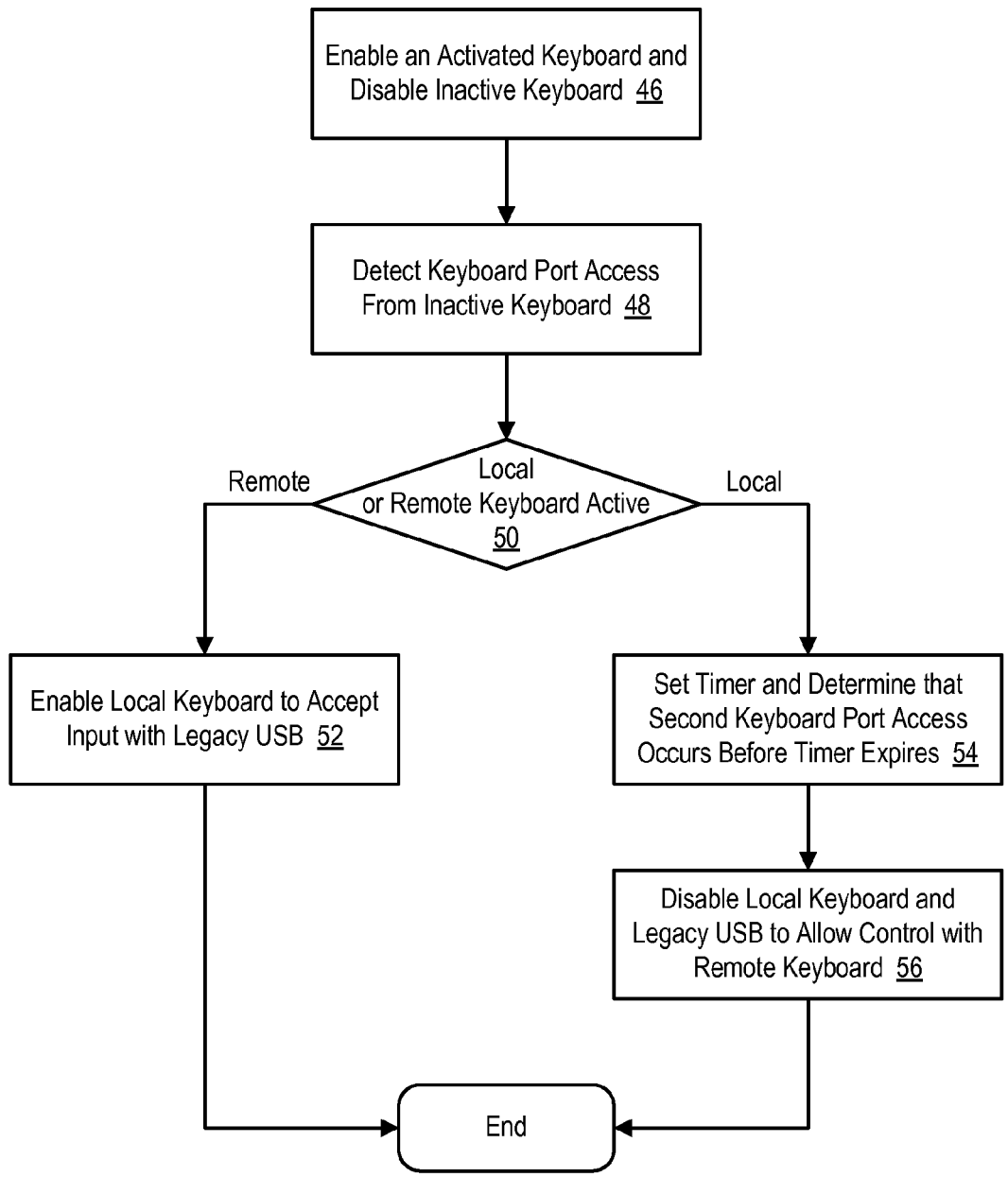
FIG. 2 depicts a flow diagram of a process for selection of legacy USB or remote keyboard access.

Referring now to FIG. 2, a flow diagram depicts the functions performed by one embodiment of remote access module 44 to select an inactivated remote or local keyboard or mouse for inputs to an information handling system by detecting activity at the inactive keyboard. The process initiates at step 46 with the enabling of an active keyboard and the disabling of an inactive keyboard, for instance by selecting a local or remote keyboard as active from a static definition or specified by a set-up option. One initiation at step 46 is complete, the process is executed from step 48 repeatedly as necessary to pass control between local and remote input devices each time an input is made to an inactive input device.

At step 48, access from an inactive keyboard is detected. For instance, if a remote keyboard is enabled, remote access module 44 detects a keypress on a local keyboard with a SMI or USB IRQ command; if a local keyboard is enabled, remote access module detects a keypress on a remote keyboard with a phantom 60h or 64h port access that is not associated with a local processor. At step 50, a determination is made of whether a local or remote keyboard is active. If a remote keyboard is active, the process continues to step 52 to enable the local keyboard to accept inputs with legacy USB, effectively disabling the remote keyboard in an information handling system with a UHCI USB controller. If a step 50 a local keyboard is active, the process continues to step 54 at which a timer is set and a determination is made of whether a second keyboard port access occurs before the time expires. For instance, upon detection of phantom port 60h or 64h access, a one second timer is initialized so that, if a second phantom port 60h or 64h access is made before the time expires, then at step 56 remote access module 44 disables legacy USB to allow remote control through bus master adapter 26. For instance, the delay timer is initiated with legacy USB code in an SMI handler. The one second delay increase the confidence that all bytes associated with a particular scan code or mouse event have been issued and lost for multi-byte scan codes and mouse events. Without the time delay, if a first byte were lost, the keyboard and mouse ISR would receive a partial scan packet and might misinterpret the keystroke or mouse movement. The timer delay results in the loss of the first remote scan code or mouse event as well as other additional scan codes or mouse events that occur during the delay.

Figure 3:
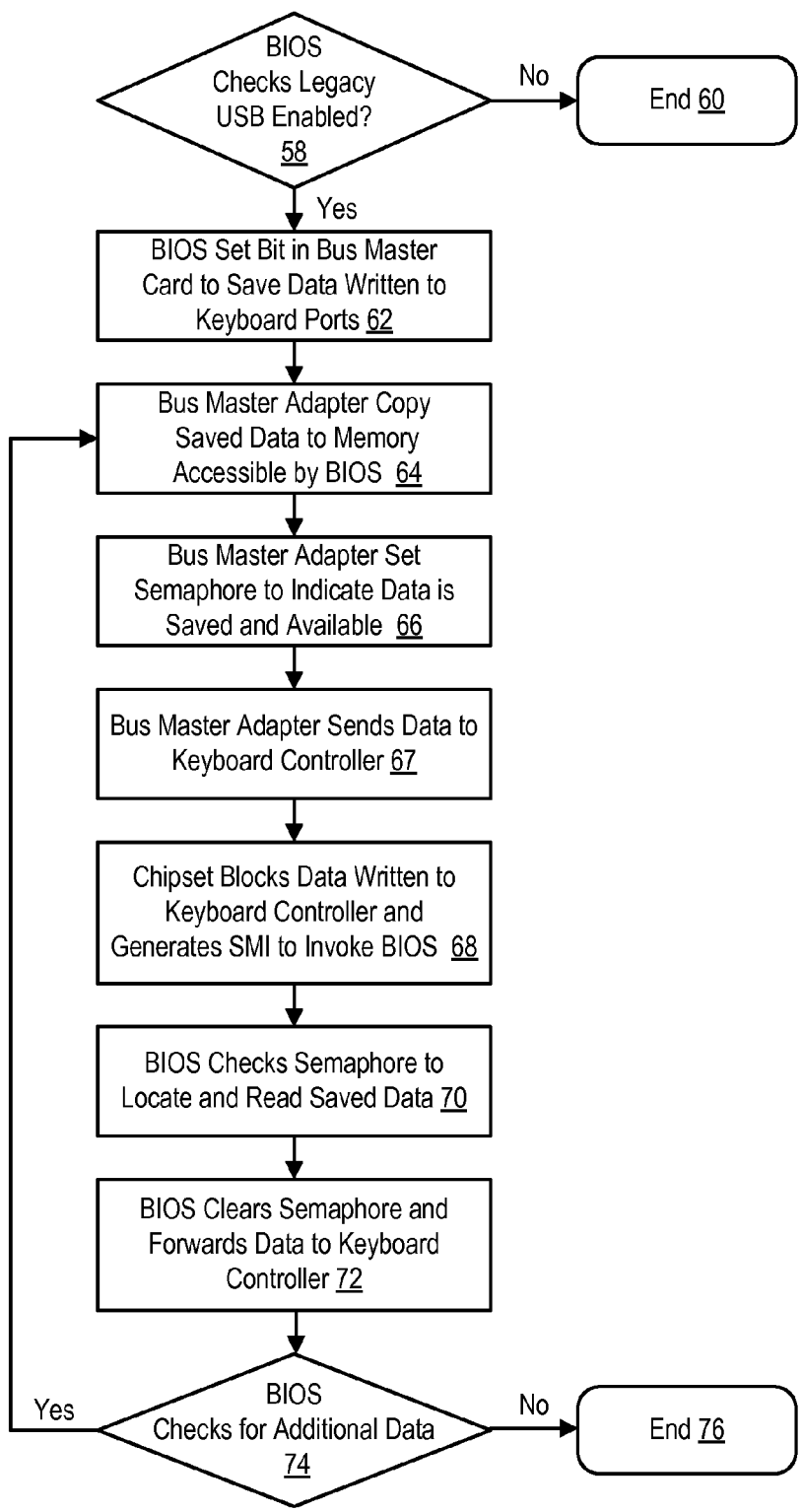
FIG. 3 depicts a flow diagram of a process for forwarding remote keyboard/mouse access data to a keyboard/mouse controller in legacy mode.

Referring now to FIG. 3, a flow diagram depicts the functions performed by another embodiment of remote access module 44 to allow concurrent input from remote keyboard or mouse and local keyboard or mouse in an information handling system without loss of input data by saving inputs for subsequent access by BIOS 32. The functions are performed with three sets of instructions, BIOS instructions, bus master adapter firmware, and a remote access control module. The process begins at step 58 with a determination by the BIOS of whether legacy USB is enabled. If not, the process ends at step 60. If legacy USB is enabled, at step 62 the BIOS sets a bit in bus master adapter 26 firmware to save data written to keyboard ports by remote devices. At step 64, the remote access instructions await keyboard or mouse inputs detected from the network interface and commands the bus master adapter to copy the remote data to memory accessible by BIOS 32. At step 66, the bus master adapter sets a semaphore to indicate to BIOS 32 that data is saved and available and to point to the location of the data. The semaphore is a synchronous object that throttles processor handling of data one piece at a time. At step 67, the bus master adapter sends the remote data to the keyboard controller. At step 68, the chipset blocks data written to the keyboard controller and generates a SMI to invoke BIOS 32 so that, at step 70 the BIOS checks the semaphore to locate and read the save remote keyboard data from the BIOS accessible memory. At step 72, BIOS 32 clears the semaphore and forwards the remote data to the UHCI USB controller for handling with the legacy USB mode. At step 74, the BIOS checks for additional remote data and, if additional remote keyboard data is detected, the process returns to step 64, otherwise the process ends at step 76. By setting the bit in firmware of bus master adapter 26 to save remote device data, remote access module 44 allows BIOS 32 to obtain data not otherwise saved by controllers compliant with the UHCI standard.

Figure 4:
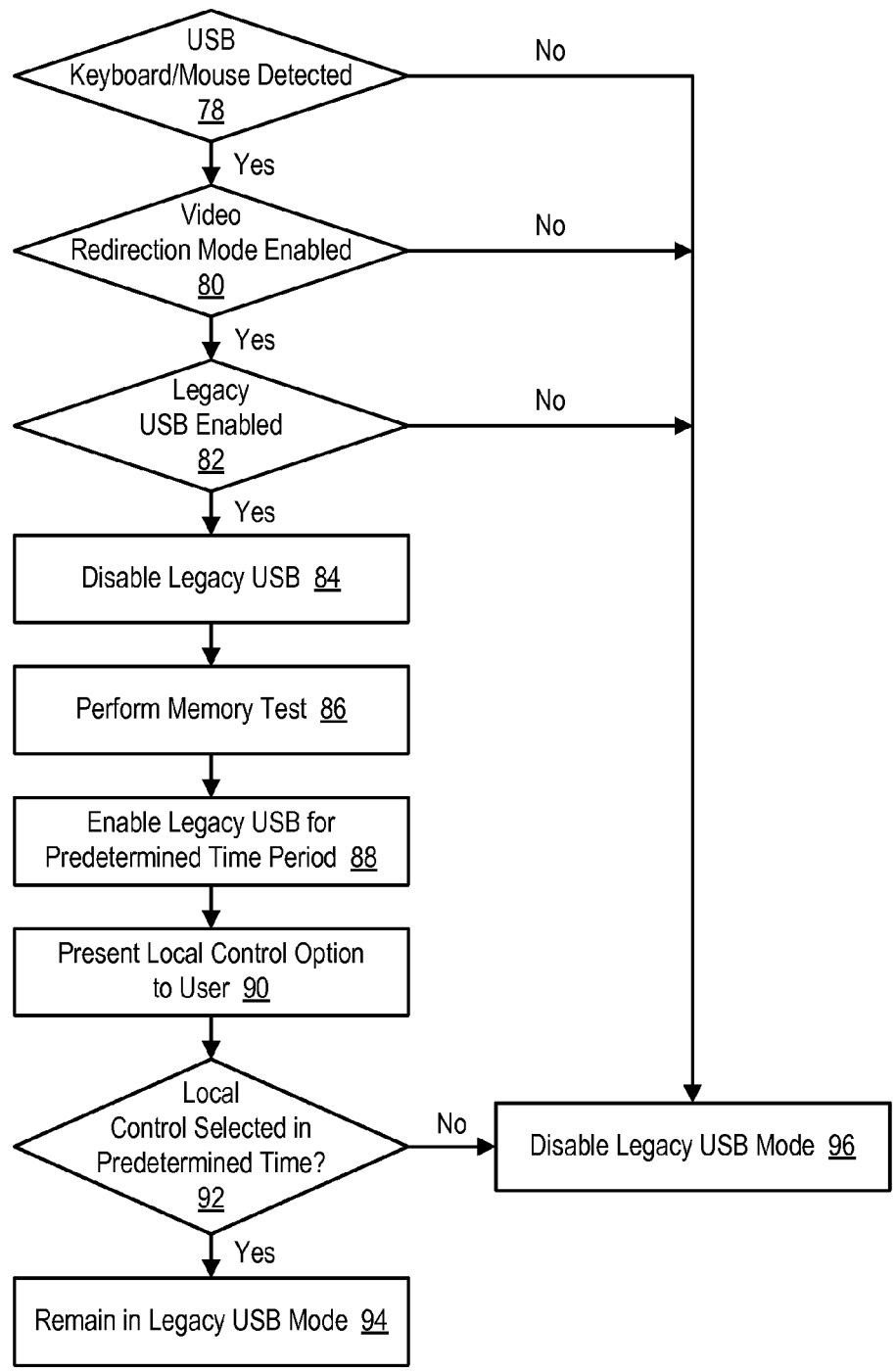
FIG. 4 depicts a flow diagram of a process for selection of local or remote keyboard control during system boot.

Referring now to FIG. 4, a flow diagram depicts the functions performed by another embodiment of remote access module 44 to select activation of a legacy USB or remote device for providing inputs to an information handling system at boot. The process begins at step 78 with a determination of whether a USB keyboard or mouse is detected and continues to step 80 for a determination of whether video redirection mode is enabled and step 82 for a determination of whether legacy USB is enabled. If any of steps 78, 80 or 82 are no, the process ends at step 96 with disabling of legacy USB mode since the lack of a USB keyboard or mouse, the presence of video redirection and the lack of legacy USB enabled each indicate that the information handling system user does not need legacy USB. At step 84, legacy USB is disabled to support the performance of the memory test at step 86. After the memory test is complete, at step 88 legacy USB is enabled for a predetermined time period, such as five seconds. At 90, while legacy USB is enabled, a local control option is presented to the user, such as with a display that states, "Server is in remote control mode, to enable access to local USB keyboard and mouse for this boot, press any key in the next 5 seconds." At step 92 a determination is made of whether the key is pressed. If a key is pressed, the process continues to step 94 to continue operations in the legacy USB mode and display a message such as, "Local USB keyboard and mouse enabled during power up." If no key is pressed during the delay time, the process continues to step 96 to disable legacy USB and display a message such as, "Local USB keyboard and mouse disabled for this boot."

Although the present invention has been described in detail, it should be understood that various changes, substitutions and alterations can be made hereto without departing from the spirit and scope of the invention as defined by the appended claims.

What is claimed is:

1. A method for selecting local or remote keyboard control of an information handling system, the method comprising:
   enabling a local keyboard with legacy USB;
   detecting a remote keyboard port access;
   setting a timer for a predetermined time period;
   detecting another remote keyboard port access in the predetermined time period; and
   disabling legacy USB to allow control of the information handling system with the remote keyboard.

2. The method of claim 1 wherein detecting a remote keyboard port access further comprises:
   detecting a keyboard port access; and
   determining that the detected keyboard port access does not originate from a local processor.

3. The method of claim 1 wherein Legacy USB controls local keyboard inputs through a UHCI USB keyboard controller.

4. A method for selecting local or remote keyboard control of an information handling system, the method comprising:
   booting the information handling system;
   detecting indicia of local keyboard control;
   enabling legacy USB local keyboard control for a predetermined time;
   presenting local control option at the information handling system;
   disabling legacy USB local keyboard control if the local control option is not selected in the predetermined time.

5. The method of claim 4 wherein detecting indicia of local keyboard control comprises:
   detecting a USB input/output device;
   detecting video redirection mode enabled; and
   detecting legacy USB support enabled.

6. The method of claim 4 further comprising:
   disabling legacy USB during memory test;
   performing the memory test;
   re-enabling legacy USB for presentation of the local control option.

7. The method of claim 4 further comprising:
   displaying a message at the information handling system that legacy USB is enabled if the local keyboard control option is selected.

* * * * *